(12) United States Patent
Kawabata

(10) Patent No.: US 10,486,361 B2
(45) Date of Patent: Nov. 26, 2019

(54) LIQUID SUPPLY APPARATUS, LIQUID DISCHARGE APPARATUS, AND THREE-DIMENSIONAL FABRICATING APPARATUS

(71) Applicant: RICOH COMPANY, LTD., Tokyo (JP)

(72) Inventor: Yoichi Kawabata, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 382 days.

(21) Appl. No.: 15/631,324

(22) Filed: Jun. 23, 2017

(65) Prior Publication Data

US 2018/0022020 A1 Jan. 25, 2018

(30) Foreign Application Priority Data

Jul. 25, 2016 (JP) ................................. 2016-145126

(51) Int. Cl.
*B29C 67/00* (2017.01)
*B41J 2/175* (2006.01)
*B29C 64/112* (2017.01)
*B01D 19/00* (2006.01)
*B29C 64/321* (2017.01)
*B29C 64/135* (2017.01)
(Continued)

(52) U.S. Cl.
CPC ............ *B29C 64/112* (2017.08); *B01D 19/00* (2013.01); *B29C 64/135* (2017.08); *B29C 64/321* (2017.08); *B41J 2/14032* (2013.01); *B41J 2/1652* (2013.01); *B29K 2105/0058* (2013.01)

(58) Field of Classification Search
CPC ... B29C 64/112; B29C 64/135; B29C 64/321; B29K 2106/0058; B01D 19/00; B01D 19/0036; B41J 2/14032; B41J 2/16517; B41J 2/1652; B41J 2/175; B41J 2/17566
USPC .......................................................... 96/193
See application file for complete search history.

(56) References Cited

U.S. PATENT DOCUMENTS

2004/0175451 A1 9/2004 Maekawa et al.
2004/0252146 A1* 12/2004 Naka .................... B41J 2/17513
347/6
(Continued)

FOREIGN PATENT DOCUMENTS

JP 2002-086748 3/2002
JP 2004-090530 3/2004
(Continued)

*Primary Examiner* — Frank M Lawrence, Jr.
(74) *Attorney, Agent, or Firm* — Oblon, McClelland, Maier & Neustadt, L.L.P.

(57) ABSTRACT

A liquid supply apparatus includes a liquid container to temporarily store liquid, a vacuum device connected to the liquid container to decompress the liquid container to form a negative pressure in the liquid container and a negative pressure forming device disposed between the liquid container and the vacuum device. The vacuum device includes a gas chamber connected to the liquid container, a flexible member forming a part of wall surface of the gas chamber, a first elastic member to push the flexible member in a first direction to expand the gas chamber, a pressing member to push the flexible member in a second direction opposite the first direction to compress the gas chamber. The gas chamber moves between a connection position and a cutoff position.

7 Claims, 8 Drawing Sheets

(51) Int. Cl.
   *B41J 2/14*      (2006.01)
   *B41J 2/165*     (2006.01)
   *B29K 105/00*    (2006.01)

(56) References Cited

U.S. PATENT DOCUMENTS

| | | |
|---|---|---|
| 2009/0289992 A1 | 11/2009 | Kawabata |
| 2012/0139992 A1 | 6/2012 | Kawabata |
| 2015/0077478 A1 | 3/2015 | Kawabata et al. |
| 2015/0211648 A1* | 7/2015 | Frahm, II .............. F16K 15/066 137/505.42 |
| 2017/0151805 A1* | 6/2017 | Sato .................... B41J 2/16526 |

FOREIGN PATENT DOCUMENTS

| | | |
|---|---|---|
| JP | 2004-291625 | 10/2004 |
| JP | 2005-014556 | 1/2005 |
| JP | 2005-119031 | 5/2005 |
| JP | 2013-091281 | 5/2013 |

\* cited by examiner

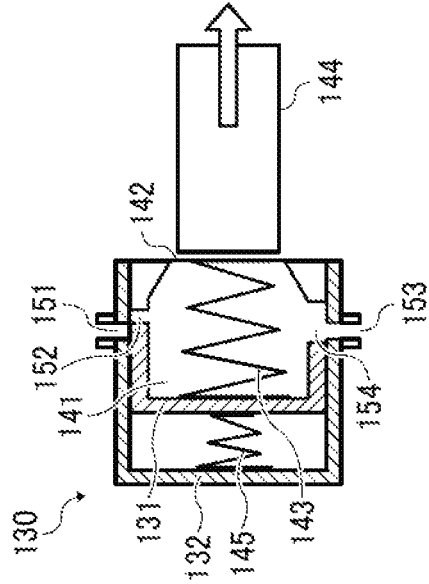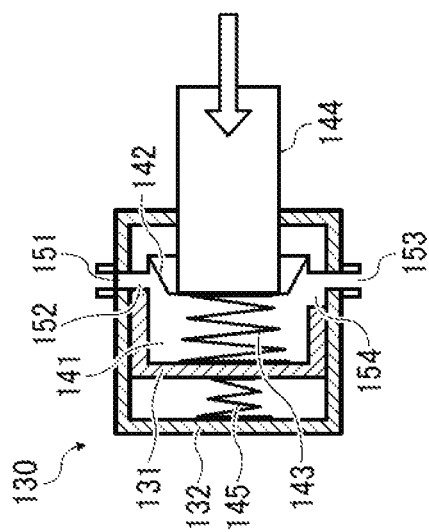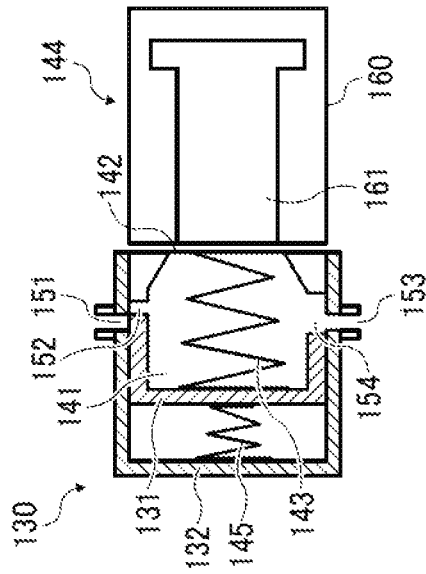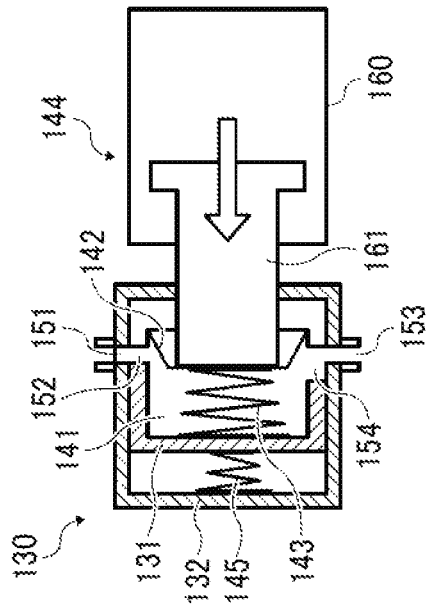

FIG. 5A
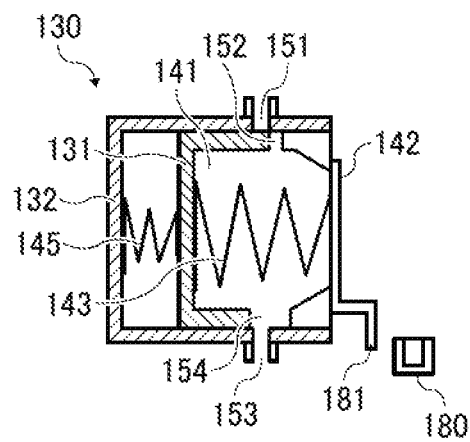
FIG. 5B
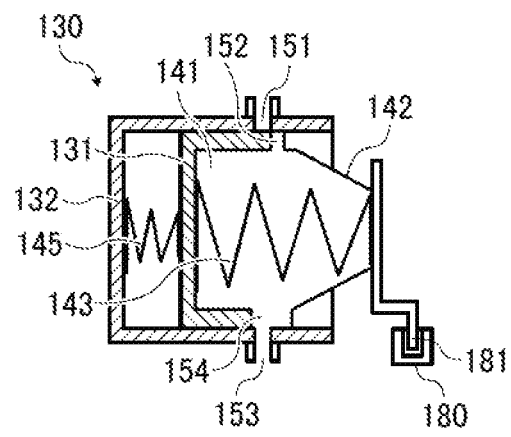
FIG. 6
|  | ACTIVATED | NOT ACTIVATED |
|---|---|---|
| DURING DISCHARGE PROCESS | FIRST STATUS | — |
| DURING NON-DISCHARGE PROCESS | SECOND STATUS | SECOND STATUS |

LIQUID SUPPLY APPARATUS, LIQUID DISCHARGE APPARATUS, AND THREE-DIMENSIONAL FABRICATING APPARATUS

CROSS-REFERENCE TO RELATED APPLICATIONS

This patent application is based on and claims priority pursuant to 35 U.S.C. § 119(a) to Japanese Patent Application No. 2016-145126, filed on Jul. 25, 2016 in the Japan Patent Office, the entire disclosures of which are hereby incorporated by reference herein.

BACKGROUND

Technical Field

Aspects of this disclosure relate to a liquid supply apparatus, a liquid discharge apparatus, and a three-dimensional fabricating apparatus.

Related Art

An apparatus for supplying liquid to a liquid discharge head includes a liquid container, an air chamber, and a vacuum device. The liquid container (hereinafter, simply "sub tank"), supplies liquid to the liquid discharge head. The air chamber is connected to the sub tank. The vacuum device includes an air pump to decompress the air chamber and maintains the sub tank at negative pressure.

SUMMARY

In an aspect of this disclosure, a novel liquid supply apparatus includes a liquid container, a vacuum device, and a negative pressure forming device. The liquid container temporarily stores liquid. The vacuum device is connected to the liquid container to decompress the liquid container to form a negative pressure in the liquid container. The negative pressure forming device is disposed between the liquid container and the vacuum device. The negative pressure forming device includes a gas chamber connected to the liquid container, a flexible member forming one wall of the gas chamber, a first elastic member to push the flexible member in a first direction to expand the gas chamber, and a pressing member to push the flexible member in a second direction opposite the first direction to compress the gas chamber. The gas chamber moves between a connection position and a cutoff position, where a connection between the gas chamber and the vacuum device is established in the connection position, and the connection is cut off in the cutoff position. The gas chamber is in the connection position when the pressing member pushes the flexible member to compress the gas chamber. The gas chamber is in the cutoff position when the pressing member is released from pressing the flexible member so that the first elastic member expands the gas chamber to maintain a pressure inside the liquid container to be negative while the connection between the gas chamber and the vacuum device is cut off.

In another aspect of this disclosure, a liquid discharge apparatus includes a liquid discharge head to discharge a liquid, a liquid container to temporary store the liquid to be supplied to the liquid discharge head, and a liquid supply device to supply liquid in the liquid container to the liquid discharge head. The liquid supply device includes a vacuum device connected to the liquid container to decompress the liquid container to form a negative pressure in the liquid container, and a negative pressure forming device disposed between the liquid container and the vacuum device. The negative pressure forming device includes a gas chamber connected to the liquid container, a flexible member forming a part of wall surface of the gas chamber, a first elastic member to push the flexible member in a first direction to expand the gas chamber, and a pressing member to push the flexible member in a second direction opposite the first direction that compresses the gas chamber. The gas chamber moves between a connection position and a cutoff position, where a connection between the gas chamber and the vacuum device is established in the connection position, and the connection is cut off in the cutoff position. The gas chamber is in the connection position when the pressing member pushes the flexible member to compress the gas chamber. The gas chamber is in the cutoff position when the pressing member is released from pressing the flexible member so that the first elastic member expands the gas chamber to maintain a pressure inside the liquid container to be negative while the connection between the gas chamber and the vacuum device is cut off.

In still another aspect of this disclosure, a three-dimensional fabricating apparatus includes a liquid discharge head to discharge a liquid, a liquid container to temporary store the liquid to be supplied to the liquid discharge head, a liquid supply device to supply liquid in the liquid container to the liquid discharge head, and a liquid curing unit to cure the liquid discharged from the liquid discharge head. The liquid supply device includes a vacuum device connected to the liquid container to decompress the liquid container to form a negative pressure in the liquid container, a negative pressure forming device disposed between the liquid container and the vacuum device. The vacuum device includes a gas chamber connected to the liquid container, a flexible member forming a part of wall surface of the gas chamber, a first elastic member to push the flexible member in a first direction to expand the gas chamber, and a pressing member to push the flexible member in a second direction opposite the first direction that compresses the gas chamber. The gas chamber moves between a connection position and a cutoff position, where a connection between the gas chamber and the vacuum device is established in the connection position, and the connection is cut off in the cutoff position. The gas chamber is in the connect ion position when the pressing member pushes the flexible member to compress the gas chamber, and the gas chamber is in the cutoff position when the pressing member is released from pressing the flexible member so that the first elastic member expands the gas chamber to maintain a pressure inside the liquid container to be negative while the connection between the gas chamber and the vacuum device is cut off.

BRIEF DESCRIPTION OF THE SEVERAL VIEWS OF THE DRAWINGS

The aforementioned and other aspects, features, and advantages of the present disclosure will be better understood by reference to the following detailed description when considered in connection with the accompanying drawings, wherein:

FIGS. 3A and 3B are schematic cross-sectional views of an air chamber member as a negative pressure forming device in the first embodiment;

FIGS. 4A and 4B are schematic cross-sectional views of an air chamber member as a negative pressure forming device in a second embodiment;

FIGS. 5A and 5B are schematic cross-sectional views of an air chamber member as a negative pressure forming device in a third embodiment;

FIG. 6 illustrates a transitional status in the air chamber member (negative pressure forming device;

Figure 1:
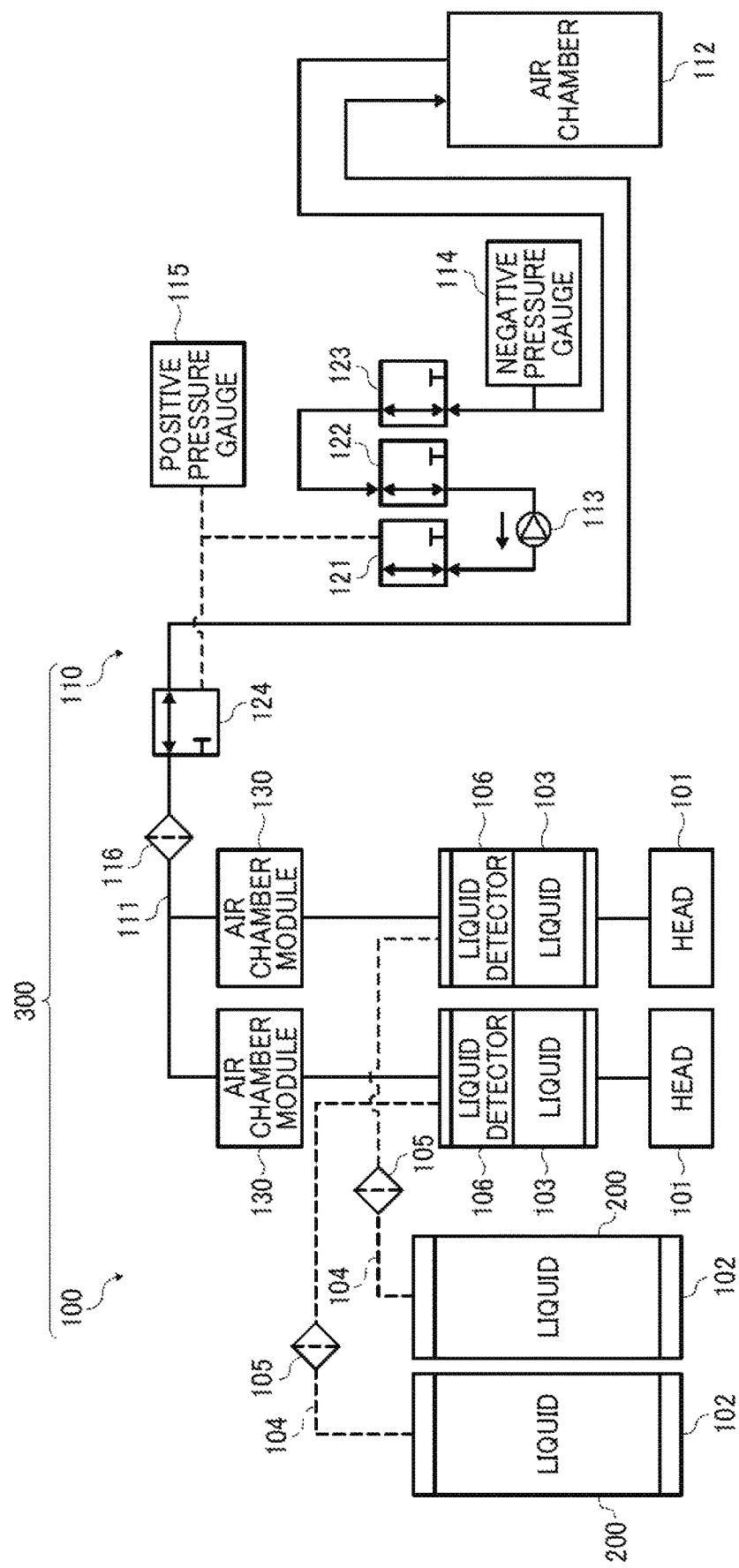
FIG. 1 illustrates a liquid supply apparatus according to a first embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarify. However, the disclosure of this patent specification is not intended to be limited to the specific terminology so selected and it is to be understood that each specific element includes all technical equivalents that have the same function, operate in a similar manner, and achieve similar results.

Although the embodiments are described with technical limitations with reference to the attached drawings, such description is not intended to limit the scope of the disclosure and all of the components or elements described in the embodiments of this disclosure are not necessarily indispensable. As used herein, the singular forms "a", "an", and "the" are intended to include the plural forms as well, unless the context clearly indicates otherwise.

Referring now to the drawings, wherein like reference numerals designate identical or corresponding parts throughout the several views, embodiments of the present disclosure are described below.

Figure 2:
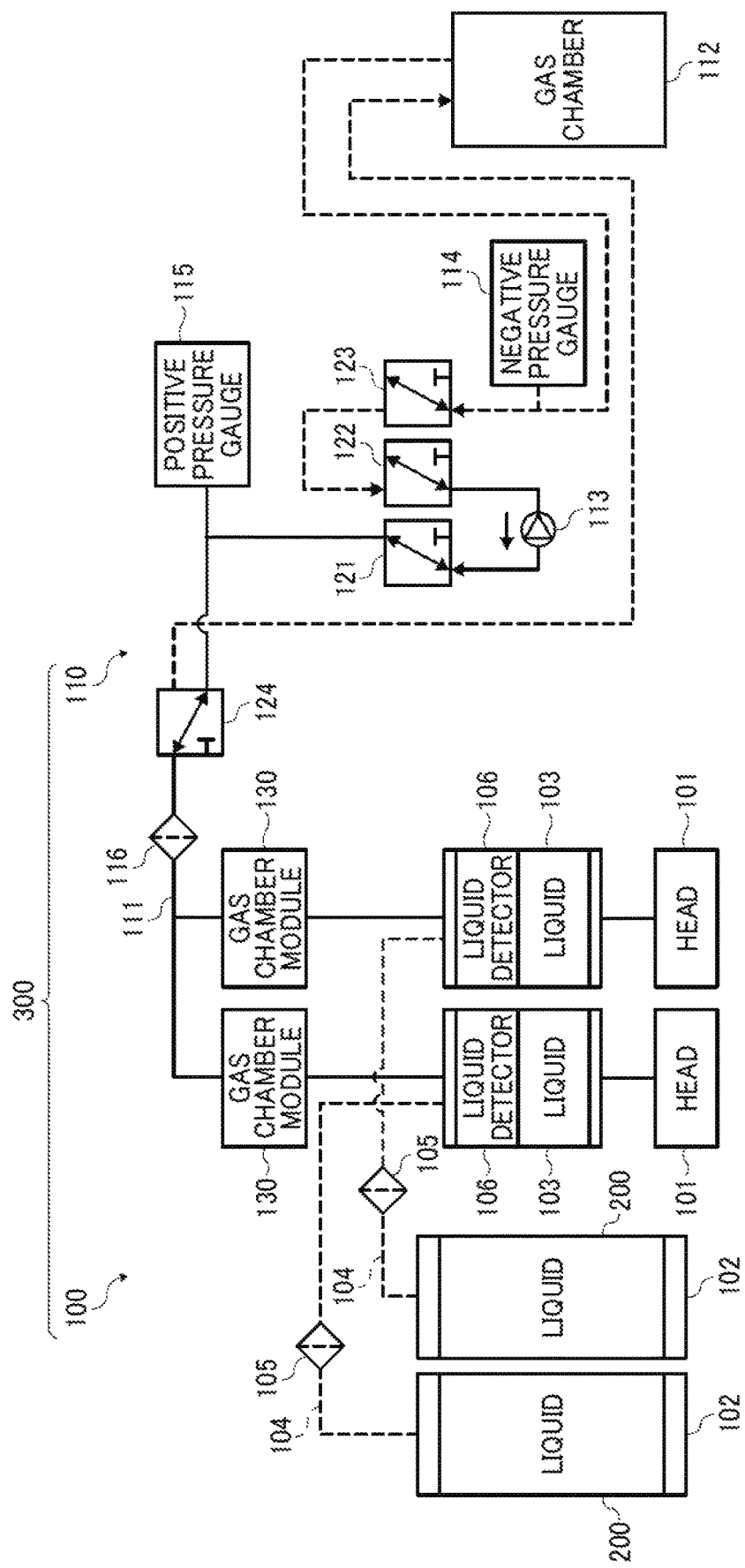
FIG. 2 illustrates the liquid supply apparatus according to the first embodiment of the present disclosure.

FIGS. 1 and 2 illustrate a schematic configuration of a liquid discharge apparatus 300 using the liquid supply apparatus 100 according to a first embodiment of the present disclosure. The liquid discharge apparatus 300 includes a liquid supply apparatus 100 and a liquid discharge head 101 having nozzles therein. The liquid supply apparatus 100 supplies liquid to the liquid discharge head 101. The liquid discharge head 101 acts as a liquid discharge device to discharge liquid from the nozzles.

It should be noted that although FIGS. 1 and 2 the liquid discharge apparatus 300 includes two liquid discharge heads 101, the configuration of the liquid discharge apparatus 300 is not limited thereto and there may be more than two liquid discharge heads 101.

The liquid supply apparatus 100 includes main tanks 102 and sub tanks 103. The main tanks 102 act as liquid storing devices and store liquid 200 to be discharged by the liquid discharge heads 101. The main tanks 102 may be in the form of a liquid cartridge detachably attachable to the liquid supply apparatus 100. The sub tanks 103 temporarily store the liquid 200 supplied from the main tanks 102 and supplies the liquid 200 to the liquid discharge heads 101, respectively. The sub tank 103 is a liquid container connected to the liquid discharge head 101.

The liquid is supplied from the main tank 102 to the sub tank 103 via the liquid supply channel 104. A liquid filter 105 is provided on the liquid supply channel 104. The sub tank 103 includes a liquid detector 106 to detect the liquid 200 in the sub tank 103.

The sub tank 103 is connected to the vacuum device 110 that decompresses the inside the sub tank 103. An air chamber module 130 is disposed between the sub tank 103 and the vacuum device 110 to connect the sub tank 103 and the vacuum device 110. The air chamber module 130 acts as a negative pressure forming device.

The vacuum device 110 includes an air chamber 112 and an air pump 113. The air chamber 112 is connected to the sub tank 103 via an air channel 111. The air pump 113 includes a diaphragm pump that decompresses the air chamber 112 by removing the ah inside the air chamber 112. Thus, negative pressure is generated inside the sub tank 103 by removing the air inside the air chamber 112.

The liquid supply apparatus 100 includes a negative pressure gauge 114 and a positive pressure gauge 115. The negative pressure gauge 114 detects pressure inside the air chamber 112. The positive pressure gauge 115 detects the pressure inside the air channel 111.

The liquid supply apparatus 100 includes solenoid valves 121 to 124. The solenoid valves 121 to 124 include three-way ports to switch connections between the air channel 111, the air chamber 112, and the air pump 113. An air filter 116 is provided on the air channel 111 and is disposed between the solenoid valve 124 and the air chamber module 130.

As illustrated in FIG. 1, the vacuum device 110 switches the solenoid valves 121 to 124 to connect the air channel 111 to the air chamber 112 and connect the air chamber 112 to the air pump 113 when generating (forming) negative pressure in the sub tank 103. The negative pressure is generated inside the sub tank 103 by making the pressure in the air channel 111 negative.

Next, the liquid supply apparatus 100 drives the air pump 113 while detecting the negative pressure inside the air chamber 112 with the negative pressure gauge 114. Thereby, the air channel 111 achieves a predetermined negative pressure status, and the sub tank 103 is decompressed to a negative pressure status.

As illustrated in FIG. 2, the vacuum device 110 switches the solenoid valves 121 to 124 to cut off the connection between the air channel 111 and the air chamber 112 and to connect the ah channel 111 to a discharge side of the air pump 113 when performing a maintenance process. The maintenance process is performed by making the pressure in the air channel 111 positive.

Next, the liquid supply apparatus 100 drives the air pump 113 while defecting the positive pressure inside the air channel 111 with the positive pressure gauge 115. Thereby, the air channel 111 achieves a predetermined positive pressure status, and the sub tank 103 is pressurized.

A configuration of the air chamber module 130 is described below with reference to FIGS. 3A and 3B.

FIGS. 3A and 3B are schematic cross-sectional views of the first example of the air chamber module 130.

The air chamber module 130 includes an air chamber member 131 and a housing 132. The air chamber member 131 is movably accommodated within the housing 132.

The air chamber member 131 is disposed between the sub tank 103 and the vacuum device 110 to form a gas chamber (air chamber) 141. One wall of the gas chamber 141 is formed of a flexible film (flexible member) 142 made of deformable material. Further, a first elastic member 143 is disposed between the flexible film 142 and the air chamber member 131 to press the flexible film 142 toward a direction to expand the space between the flexible film 142 and the air chamber member 131.

The housing 132 includes a first opening 151 that is connected to the air channel 111 of the vacuum device 110. The air chamber member 131 includes a second opening 152 alignable with the first opening 151 of the housing 132.

The housing 132 farther includes a third opening 153 that is connected to the sub tank 103. The air chamber member 131 includes a fourth opening 154 that always communicates with the third opening 153 of the housing 132. Thereby, the gas chamber 141 is always communicated with the sub tank 103.

A pressing member 144 is retractably provided to press the deformable flexible film 142 toward a direction opposite the pressing direction of the first elastic member 143 to maximally compress the gas chamber 141. The pressing member 144 is released from pressing the flexible film 142 when power to the vacuum device 110 is cut off, for example.

The air chamber module 130 includes a second elastic member 145 dial is disposed between the air chamber member 131 and the housing 132 on the opposite side of the pressing member 144. The second elastic member 145 presses the air chamber member 131 toward a direction opposite a pressing direction of the pressing member 144. The second elastic member 145 can press the air chamber member 131 to the position where the second opening 152 of the air chamber member 131 is not aligned with the first opening 151 of the housing 132.

When the pressing member 144 presses the flexible film 142 to maximally compress the gas chamber 141, the air chamber member 131 moves to a communication position where the second opening 152 of the air chamber member 131 is aligned with the first opening 151 of the housing 132 against the restorative force of the second elastic member 145. Thereby, the gas chamber 141 and the vacuum device 110 are connected with each other. In other words, a connection (communication) between the gas chamber 141 and the vacuum device 110 is established.

When the pressing member 144 is released from pressing the flexible film 142, the air chamber member 131 moves to a cutoff position where the second opening 152 of the air chamber member 131 is not aligned with the first opening 151 of the housing 132 by the restorative force of the second elastic member 145. Thereby, the connection (communication) between the gas chamber 141 and the vacuum device 110 is cut off.

When the vacuum device 110 generates a negative pressure in the sub tank 103, the pressing member 144 presses the flexible film 142 against the pressing force of the first elastic member 143 to maximally compress the gas chamber 141 as illustrated in FIG. 3A. Thus, the air chamber member 131 is moved to the connection position where the gas chamber 141 is connected to the vacuum device 110 against the restorative force of the second elastic member 145. In other words, a connection between the gas chamber 141 and the vacuum device 110 is established in the connection position. Thereby, the liquid supply apparatus 100 drives the air pump 113 according to the detection result of the negative pressure gauge 114 that detects the pressure inside the air chamber 112 of the vacuum device 110. Thereby, the vacuum device 110 decompresses the inside the sub tank 103 through the gas chamber 141 and the air channel 111 to generate negative pressure inside the sub tank 103.

When a power supply to the vacuum device 110 is cut off, the air pump 113 does not work. Accordingly, as illustrated in FIG. 3B, the pressing member 144 is separated from the flexible film 142 of the gas chamber 141 so that the pressing member 144 is released from pressing the flexible film 142. At this time, by the restorative force of the second elastic member 145, the air chamber member 131 moves to the cutoff position where the second opening 152 of the air chamber member 131 is not aligned with the first opening 151 of the housing 132. In other words, a connection between the gas chamber 141 and the vacuum device 110 is cut off in the cutoff position. The air chamber member 131 thus moves between the connection position and the cutoff position.

Thus, with release of the pressing force of the pressing member 144 against the flexible film 142, the flexible film 142 deforms by the pressing force of the first elastic member 143 to expand the gas chamber 141.

In this way, it is possible to maintain the negative pressure inside the sub tank 103, which is connected to the gas chamber 141, by enlarging the capacity of the gas chamber 141 while cutting off the connection between the gas chamber 141 and the vacuum device 110.

Therefore, even the vacuum device 110 does not work, leaking of liquid from the nozzle of the liquid discharge head 101 can be suppressed. In this way, the liquid supply apparatus 100 can maintain the negative pressure status in the sub tank 103 (liquid container) even when the power supply to the vacuum device 110 is cut off.

Next, a second embodiment of the present disclosure is described below with reference to FIGS. 4A and 4B.

FIGS. 4A and 4B are schematic cross-sectional views of an air chamber module 130 in the second embodiment. The air chamber module 130 acts as a negative pressure forming device.

Unlike in the first embodiment described above, a solenoid 160 is used as pressing member 144 in the second embodiment. In addition, the solenoid 160 has a plunger 161 that protrudes toward the flexible film 142 when the solenoid is activated.

Therefore, when the air pump 113 of the vacuum device 110 does not work because of a power failure, for example, power supply to the solenoid 160 is also cut off.

When the vacuum device 110 generates a negative pressure in the sub tank 103, the liquid supply apparatus 100 supplies power (electricity) to the solenoid 160 to project the plunger 161 toward the flexible film 142 as illustrated in FIG. 4A.

Thus, the plunger 161 pushes the flexible film 142 against the pressing force of the first elastic member 143 to compress the gas chamber 141 maximally. Thus, the air chamber member 131 is moved to the connection position where the gas chamber 141 is connected to the vacuum device 110 against the restorative force of the second elastic member 145.

Thereby, the liquid supply apparatus 100 drives the air pump 113 according to the detection result of the negative pressure gauge 114 that detects the pressure inside the air chamber 112 of the vacuum device 110. Thereby, the vacuum device 110 decompresses inside the sub tank 103 through the gas chamber 141 and the air channel 111 to generate negative pressure inside the sub tank 103.

Therefore, when a power source is cut off because of power failure, for example, a power supply to the vacuum device 110 is also cut off. Thus, the air pump 113 stops, and power supply to the solenoid 160 is also cut off.

At the same time, as illustrated in FIG. 4B, the plunger 161 is drawn inside the solenoid 160, and the plunger 161 is separated from the flexible film 142 of the gas chamber 141 so that the plunger 161 is released from pressing the flexible film 142.

At this time, the air chamber member 131 moves to the cutoff position where the second opening 152 of the air chamber member 131 is not aligned with the first opening 151 of the housing 132 by the restorative force of the second elastic member 145. Thus, the connection between the gas chamber 141 and the vacuum device 110 is cut off. Thus, with release of the pressing force of the pressing member 144 against the flexible film 142, the flexible film 142 deforms by the pressing force of the first elastic member 143 to expand the gas chamber 141.

In this way, it is possible to maintain the negative pressure inside the sub tank 103, which is connected to the gas chamber 141, by enlarging the capacity of the gas chamber 141 while cutting off the connection between the gas chamber 141 and the vacuum device 110.

Next, a third embodiment of the present disclosure is described below with reference to FIGS. 5A and 5B and FIG. 6.

FIGS. 5A and 5B are schematic cross-sectional views of an air chamber module 130 in the third embodiment. The air chamber module 130 acts as a negative pressure forming device.

FIG. 6 describes a transition status in the air chamber module (negative pressure forming device) 131.

Unlike in the first end second embodiments, the air chamber module 130 of the present embodiment includes a displacement member (hereinafter, simply "feeler") 181 and a position-detection sensor 180. The feeler 181 displaces according to a deformation (displacement) of the flexible film 142 of the gas chamber 141. The position-detection sensor 180 is a detector for defecting whether the feeler 181 is displaced to a predetermined position.

The position-detection sensor 180 is disposed at a position where the position-detection sensor 180 detects the feeler 181 when the feeler 181 moves to the predetermined position. In other words, the position-detection sensor 180 detects the feeler 181 when the flexible film 142 deforms toward a direction to expand the gas chamber 141 in a state in which the pressing member 144 is released from pressing the flexible film 142 (when the pressing member 144 does not press the flexible film 142).

Therefore, when the negative pressure in the gas chamber 141 is proper, the feeler 181 is at a position (status) that cannot be detected by the position-detection sensor 180 as illustrated in FIG. 5A. Therefore, it is possible to determine that the negative pressure in the gas chamber 141 is proper when the position-detection sensor 180 does not detect the feeler 181.

On the other hand, when the negative pressure in the gas chamber 141 decreases, the flexible film 142 is pressed by the first elastic member 143 to deform outward. Thus, the position-defection sensor 180 detects the feeler 181 as illustrated in FIG. 5B. Therefore, it is possible to determine that the negative pressure in the gas chamber 141 is decreased when the position-detection sensor 180 detects the feeler 181.

In the present embodiment, even when the vacuum device 110 is operable, the liquid supply apparatus 100 generates negative pressure in the sub tank 103 while switching between a first status and a second status as illustrated in FIG. 6. The vacuum device 110 generates the negative pressure in the first status. The air chamber module 130 generates the negative pressure in the second status.

If the solenoid 160 is used for the pressing member 144 as in the second embodiment, if is possible to control whether to press the flexible film 142 with the plunger 161 by switching the power supply of the solenoid 160. For example, the plunger 161 presses the flexible film 142 when the solenoid 160 is activated (energized), and the plunger 161 is released from pressing the flexible film 142 when the solenoid is not activated (energized).

When the liquid supply apparatus 100 is in operation, it is necessary to continuously activate the solenoid 160 in order to keep pressing the flexible film 142 with the plunger 161 and to generate the negative pressure in the gas chamber 141 by the vacuum device 110. Thus, the solenoid 160 is heated by the successive energization, and this heat cause reduction of a suction force of the solenoid 160. Further, the air pump 113 is operated frequently that shortens the life of the solenoid 160 and the air pump 113.

Therefore, even when the liquid supply apparatus 100 is in activated (energized) status, the liquid supply apparatus 100 cuts off (stops) supplying power to the solenoid 160 when the liquid discharge head 101 is in a state of non-discharge, in which the liquid discharge head 101 does not discharge liquid. At this time, the negative pressure in the sub tank 103 is generated by the first elastic member 143 and the flexible film 142 of the gas chamber 141 of the air chamber module 130 (second status). The first elastic member 143 and the flexible film 142 of the gas chamber 141 act as a negative pressure forming device.

Thereby, the second embodiment as illustrated in FIGS. 4A and 4B can extend the life of the solenoid 160 and the air pump 113.

When the liquid supply apparatus 100 is activated (energized) and the liquid discharge head 101 is in a discharge state to perform liquid discharge, the liquid supply apparatus 100 does not generate the negative pressure in the second status but generate the negative pressure in the first status that uses the vacuum device 110.

The liquid supply apparatus 100 does not generate the negative pressure with the second status because the pressure inside the sub tank 103 constantly fluctuates when the liquid 200 in the sub tank 103 is consumed by the liquid discharge of the liquid discharge head 101. The liquid supply apparatus 100 transits from the first status to the second status after the liquid discharge of the liquid discharge head 101 ends.

Thus, there may be a case in which the liquid supply apparatus 100 cannot sufficiently maintain the negative pressure in the sub tank 103 because of a slow leak in the air channel 111 over time, for example.

Therefore, in the third embodiment as illustrated in FIGS. 5A and 5B, when the position-detection sensor 180 detects the feeler 181, and it is determined that the negative pressure in the gas chamber 141 is decreased, the pressing member 144 presses the flexible film 142 to move the air chamber member 131 to the connection position to connect the gas chamber 141 and the vacuum device 110. Then, the liquid supply apparatus 100 transits to the first status from the second status to generate the negative pressure with the vacuum device 110. Then, the liquid supply apparatus 100 transits to the second status from the first status after the pressing member is released from pressing the flexible film 142. Thus, the negative pressure in the gas chamber 141 is maintained properly.

Next, an example of a three-dimensional fabricating apparatus according to an embodiment of the present disclosure is described with reference to FIGS. 7 through 10.

Figure 7:
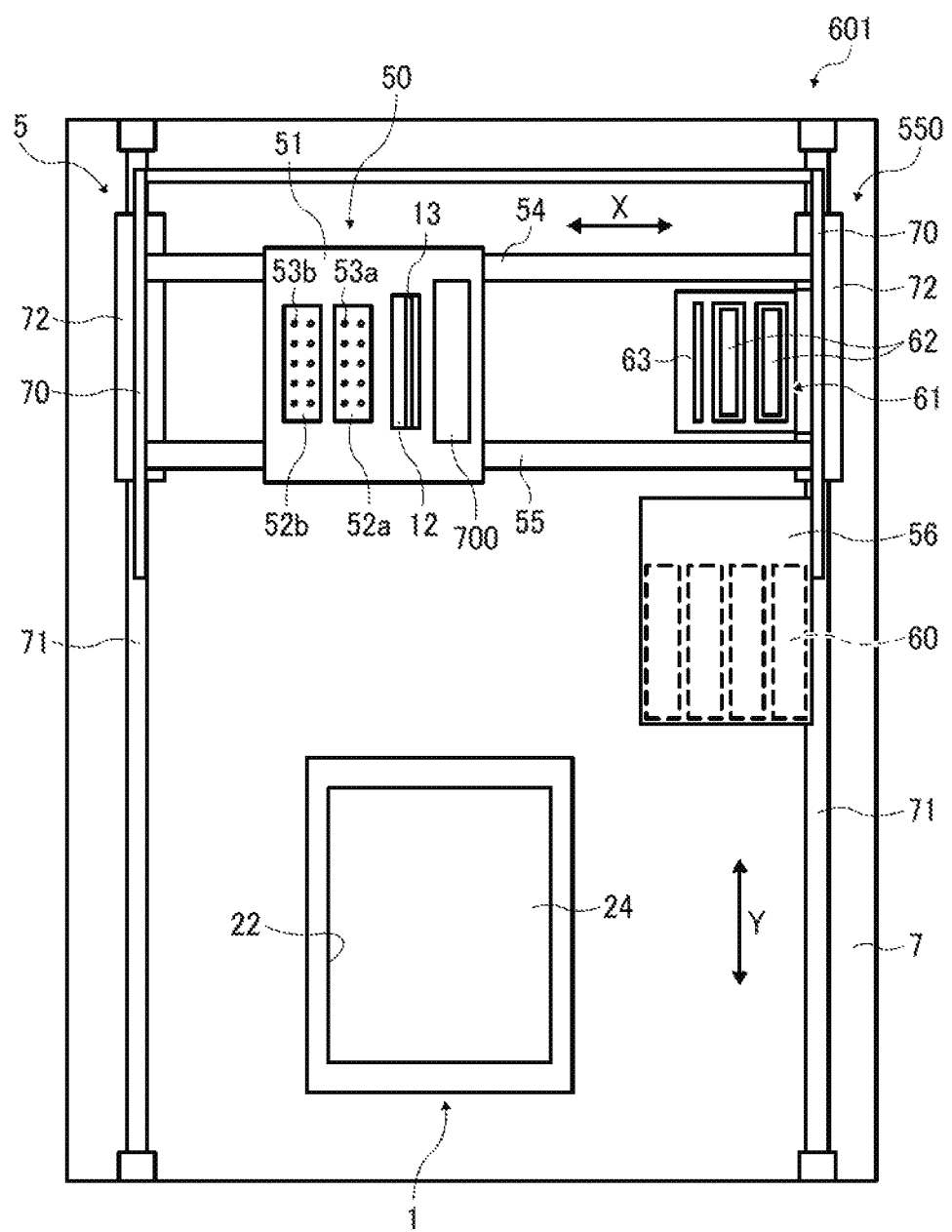
FIG. 7 is a plan view of an example of a three-dimensional fabricating apparatus including the liquid supply apparatus according to the present disclosure.
Figure 8:
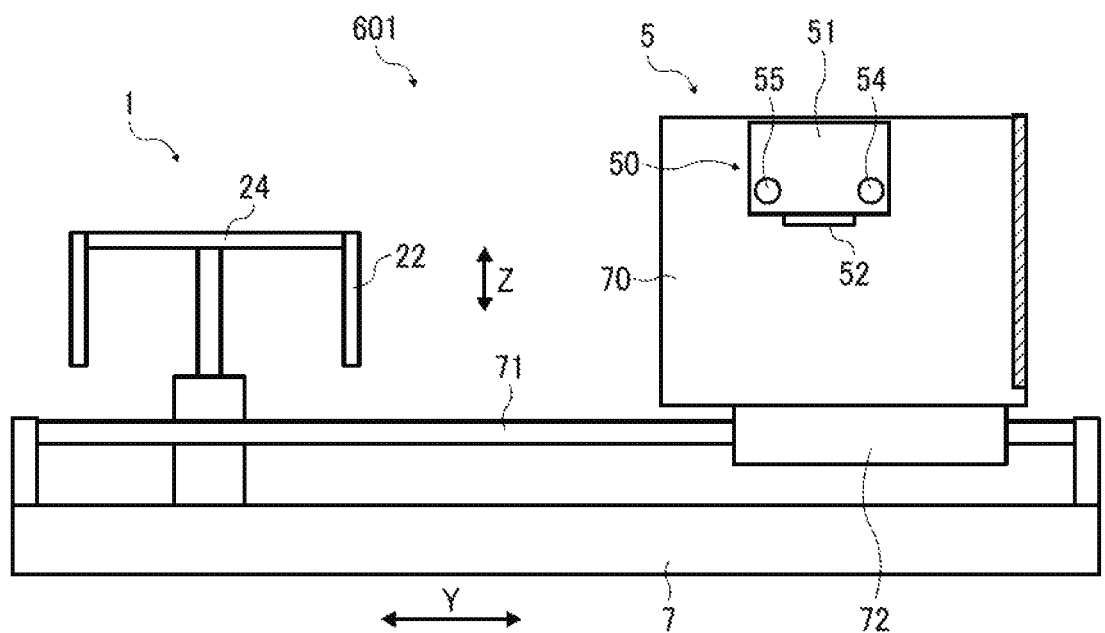
FIG. 8 is a cross-sectional side view of the three-dimensional fabricating apparatus in FIG. 7.
Figure 9:
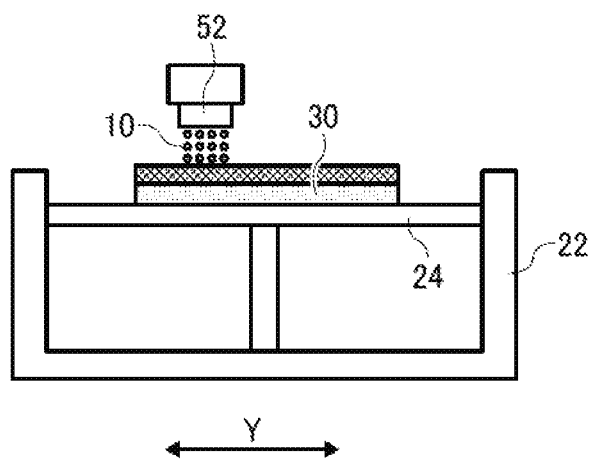
FIG. 9 is a cross-sectional view along a Y-direction of the three-dimensional fabricating apparatus in FIG. 7.
Figure 10:
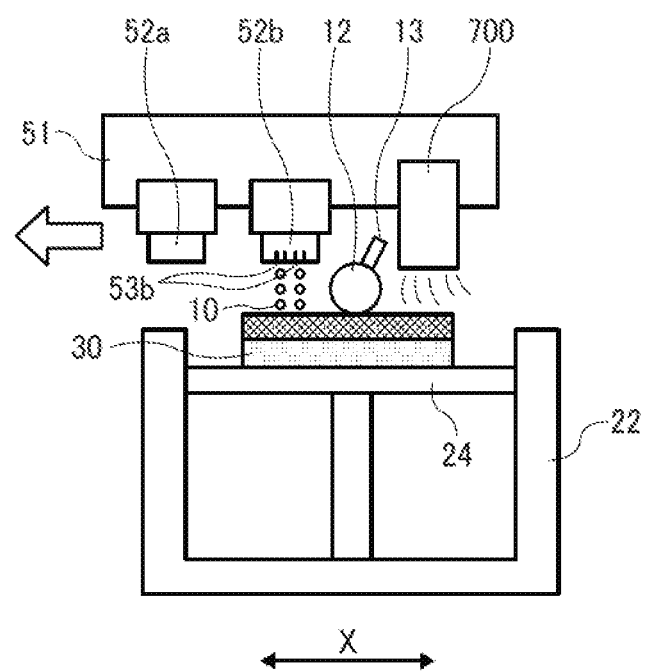
FIG. 10 is a cross-sectional view along X-direction of the three-dimensional fabricating apparatus in FIG. 7.

FIG. 7 is a schematic plan view of the three-dimensional fabricating apparatus. FIG. 8 is a schematic side view of the three-dimensional fabricating apparatus. FIG. 9 is a cross-sectional view along Y-direction of the fabrication section of the three-dimensional fabricating apparatus. FIG. 10 is a cross-sectional view along X-direction of the fabrication section of the three-dimensional fabricating apparatus.

In FIGS. 9 and 10, a state of the fabricating section during fabricating a three-dimensional object is illustrated.

The three-dimensional fabricating apparatus 601 for fabricating a three-dimensional object illustrated in FIGS. 7 through 11 is a material jetting type of the three-dimensional fabricating apparatus. The three-dimensional fabricating apparatus 601 includes a fabrication section 1 and a fabrication unit 5.

The fabrication section 1 forms a fabrication layer 30 that is a layered fabrication object in which the liquid discharged from liquid discharge heads 52a and 52b (hereinafter, collectively simply "heads 52") is cured and hardened. The fabrication unit 5 fabricates the fabrication layer 30 by discharging fabrication liquid 10 onto a fabrication stage 24 of the fabrication section 1.

The fabrication section 1 includes a fabrication chamber 22 in which fabrication layers 30 are laminated to fabricate an object. A bottom of the fabrication chamber 22 acts as a fabrication stage 24. A motor 28, which will be described later, moves the fabrication stage 24 upward and downward along a direction (height direction) indicated by arrow Z in FIG. 8. A three-dimensional object in which the fabrication layers 30 are laminated is fabricated on the fabrication stage 24.

The fabrication unit 5 includes a liquid discharge unit 50 to discharge fabrication liquid 10 to the fabrication layer 30 on the fabrication stage 24.

The liquid discharge unit 50 includes a carriage 51 and the heads 52 mounted on the carriage 51. The heads 52 act as fabrication liquid appliers. In FIG. 1, two heads 52 are illustrated. However, the number of heads 52 may be one, or three or more.

The carriage 51 is movably held with guides 54 and 55. The guides 54 and 55 are held with lateral side plates 70, which are provided on both sides of the fabrication unit 5, so as to be movable vertically upward and downward.

Via a pulley and a belt, an X-direction scanning motor constituting an X-direction scanning assembly 550 reciprocally moves the carriage 51 along the direction indicated by arrow X that is a main scanning direction. Note that, hereinafter, the direction indicated by arrow X is simply referred to as "X-direction", and the same applies to "Y-direction" and "Z-direction".

As illustrated in FIG. 7, each of the two heads 52 includes two nozzle rows 53a and 53b, each including a plurality of nozzles arrayed to discharge fabrication liquid 10. Two nozzle rows 53a of the head 52a discharge cyan fabrication liquid and magenta fabrication liquid, respectively. Two nozzle rows 53b of the head 52b discharge yellow fabrication liquid and black fabrication liquid, respectively.

Note that the configuration of heads 52 is not limited to the above-described configuration and may be any other suitable configuration. For example, each of the heads 52 may discharge identical colors of the fabrication liquid 10.

After an object is fabricated by discharging and curing the discharged fabrication liquid 10, the fabricated object may be colored.

A tank mount 56 mounts a plurality of tanks 60 containing cyan fabrication liquid, magenta fabrication liquid, yellow fabrication liquid, and black fabrication liquid. The fabrication liquids are supplied to the heads 52 through, e.g., supply tubes from the tanks 60.

The liquid discharge unit 50 mounts a flattening roller 12 and a fabrication liquid curing unit 700 on the carriage 51. The fabrication liquid curing unit 700, the flattening roller 12, and the heads 52 are disposed in this order on the carriage 51 along the main scanning direction (X-direction) of the carriage 51 from right to left in FIGS. 7 and 10. The main scanning direction (X-direction) is a direction of movement of the carriage 51 during forming the fabrication layer 30.

The flattening roller 12 flattens a surface of the fabrication liquid 10 discharged on the fabrication stage 24 of the fabrication chamber 22. Means for flattening the fabrication liquid 10 is not limited to a roller, and alternatively a planar blade may be used. Means for flattening the fabrication liquid 10 may have a shape other than a roller or a blade so long as it can flatten the fabrication liquid 10 discharged on the fabrication stage 24.

The flattening roller 12 is disposed to be relatively reciprocally movable with respect to the surface of the fabrication stage 24 on which the fabrication liquid 10 is discharged along a direction indicated by arrow X in FIGS. 7 and 10. That is, the flattening roller 12 moves along the stage surface of the fabrication stage 24, driven to rotate by a motor 26 described below.

The fabrication liquid curing unit 700 cures and hardens the fabrication liquid 10 discharged from the heads 52. The fabrication liquid curing unit 700 may use ultraviolet (UV) irradiating lamps, election beam irradiators, etc. for curing the fabrication liquid 10. The fabrication liquid curing unit 700 preferably includes an ozone removing mechanism.

The ultraviolet irradiating lamp includes, for example, a high pressure mercury lamp and an ultra-high pressure mercury lamp, and a metal halide lamp. The ultra-high pressure mercury lamp is a point light source, but if a UV lamp combined with an optical system having a high light use efficiency is used, the UV lamp is capable of irradiating a short-wavelength modeling portion.

The metal halide lamp is suitable for colored materials because the metal halide lamp has a wide wavelength modeling portion. Halogenated compound of metal such as Pb, Sn, and Fe are used, and the halogenated compound can be selected according to the absorption spectrum, of a photo-initiator. There is no particular limitation for the lamp if the lamp can cure and harden the fabrication liquid 10.

Further, a maintenance assembly 61 to maintain and recover the heads 52 of the liquid discharge unit 50 in good condition is disposed at one end in the X-direction. The maintenance assembly 61 includes caps 62 and a wiper 63. The caps 62 are brought into close contact with nozzle faces (nozzle formed faces) of the heads 52, and fabrication liquid 10 is sucked from nozzles of the heads 52.

Thus, thickened fabrication liquid 10 clogged at the nozzles are discharged from the nozzle of the heads 52. Then, the wiper 63 wipes a nozzle faces of the heads 52 to form meniscus in the nozzles (with the interiors of the nozzles being in negative pressure state). The maintenance assembly 61 covers the nozzle faces of the heads 52 with the caps 62 to prevent drying of the fabrication liquid 10 inside the nozzles when the fabrication liquid 10 is not discharged with the heads 52.

The fabrication unit 5 includes a slider portion 72 slidably supported on a guide 71 above a base 7 as illustrated is FIGS. 7 and 8. The fabrication unit 5 is reciprocally movable in the Y-direction (sub-scanning direction) perpendicular to the X-direction. Further, the fabrication unit 5 is reciprocally moved along the Y-direction by the Y-direction scanning assembly 552 described-below.

The liquid discharge unit 50 is disposed to be movable upward and downward along the Z-direction together with the guides 54 and 55. A Z-direction elevation assembly 551 moves the liquid discharge unit 50 upward and downward along the Z-direction.

In the following, the fabrication section 1 is further described.

The fabrication chamber 22 has a box-like shape and has an opening on its top surface. The fabrication stage 24 is vertically movable upward and downward inside the fabrication chamber 22.

Lateral faces of the fabrication stage 24 are disposed to contact inner lateral faces of the fabrication chamber 22. The top faces of the fabrication stage 24 are held horizontally. The flattening roller 12 is a cylindrical bar. The flattening roller 12 reciprocally moves together with the carriage 51 along the stage surface of the fabrication stage 24 in the X-direction (main scanning direction) as illustrated in FIGS. 7 and 10.

The flattening roller 12, while being rotated by the motor 26, horizontally moves forward and backward to pass an area above the fabrication chamber 22. Accordingly, the flattening roller 12 flattens the surface of the fabrication liquid 10 discharged onto the fabrication stage 24 while passing over the fabrication chamber 22. Further, the fabrication liquid curing unit 700 cures and hardens the fabrication liquid 10, thus forming the fabrication layer 30.

As illustrated in FIG. 10, a liquid removing blade 13 act as a liquid remover is arranged to contact a circumference surface of the flattening roller 12 to remove the fabrication liquid 10 attached to the flattening roller 12. The liquid removing blade 13 is a plate-like blade made of rubber. However, the liquid removing blade 13 may have other shapes such as roller if it can remove the fabrication liquid 10 attached to the flattening roller 12.

The liquid removing blade 13 may be oriented in any direction to follow or counter a direction of rotation of the flattening roller 12 to flatten the fabrication liquid 10.

Figure 11:
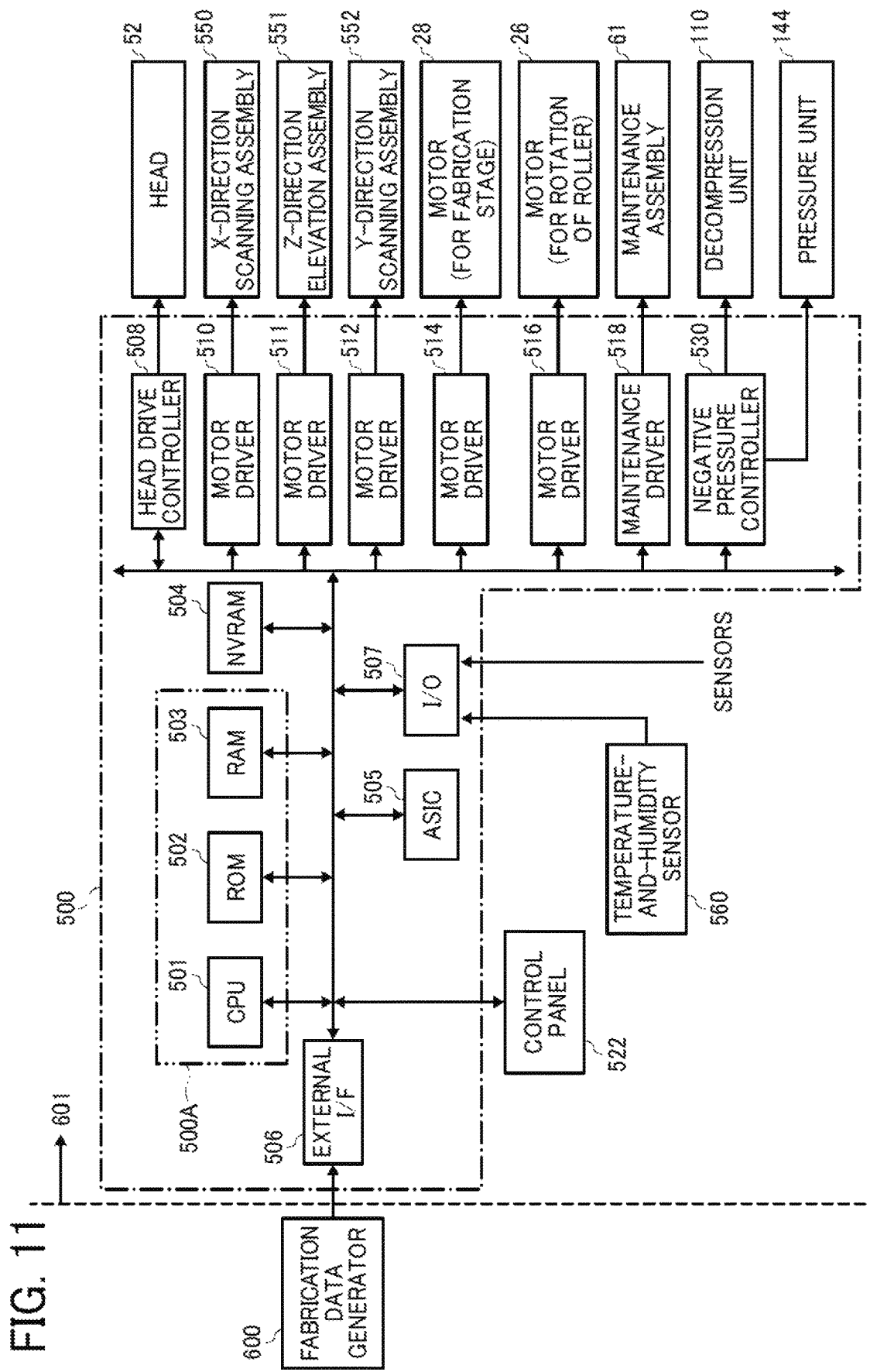
FIG. 11 is a block diagram of a controller of the three-dimensional fabricating apparatus.

Next, an outline of a control circuit 500 of the three-dimensional fabricating apparatus 601 in this embodiment is described with reference to FIG. 11. FIG. 11 is a block diagram of the control circuit 500.

A control circuit 500 includes a main controller 500A. The main controller 500A includes a central processing unit (CPU) 501, a read-only memory (ROM) 502, and a random access memory (RAM) 503. The CPU 501 manages the control of the entire three-dimensional fabricating apparatus 601. The ROM 502 stores programs executed by the CPU 501 and other fixed data. The programs stored in the ROM 502 include programs for causing the CPU 501 to execute a three-dimensional fabricating operation, which includes control of the three-dimensional fabricating apparatus 601 according to embodiments of the present disclosure. The RAM 503 temporarily stores fabrication data and other data.

The control circuit further includes a nonvolatile memory (NVRAM) 504 to store the data even when power to the apparatus is blocked. In addition, the control circuit 500 further includes an application specific integrated circuit (ASIC) to perform image processing to handle various signals related to image data and input/output signals to control the apparatus entirely.

The control circuit 500 also includes an interface (I/F) 506 to send and receive data and signals used in receiving fabrication data from an external fabrication data generating apparatus 600.

The fabrication data generating apparatus 600 is an apparatus for generating data for fabricating three-dimensional object according to the embodiment of the present disclosure. The fabrication data generating apparatus 600 generates fabrication data in which a final-form object (three-dimensional object) is sliced in multiple fabrication layers, and is constituted of an information processing apparatus, such as a personal computer. The control circuit includes an input-output (I/O) unit 507 to receive detection signals of various sensors.

The control circuit 500 includes a head drive controller 508 to control driving of the heads 52 of the liquid discharge unit 50.

The control circuit includes a motor driver 510 and a motor driver 512. The motor driver 510 drives a motor constituting the X-direction scanning assembly 550 to move the carriage 51 of the liquid discharge unit 50 in the X-direction (the main scanning direction). The motor driver 512 drives a motor constituting the Y-direction scanning assembly 552 to move the fabrication unit 5 in the Y-direction (the sub-scanning direction).

The control circuit includes a motor driver 511 to drive a motor constituting the Z-direction elevation assembly 551 to move (elevate) the carriage 51 of the liquid discharge unit 50 upward and downward in the Z-direction. The motor driver 511 may alternatively elevate the fabrication unit 5 as a whole in the Z-direction.

The control circuit 500 includes a motor driver 514. The motor driver 514 drives the motor 28 to elevate the fabrication stage 24 upward and downward. The control circuit also includes a motor driver 516 to drive a motor 26 that drives and rotates flattening roller 12.

The control circuit includes a maintenance driver 518. The maintenance driver 518 drives the maintenance assembly 61 of the liquid discharge unit 50.

The I/O unit 507 of the control circuit receives detection signals from, e.g., a temperature-and-humidity sensor 560 to detect temperature and humidity as environmental conditions of the apparatus and also receives detection signals from other sensors.

A control panel 522 used to input and display information necessary to the three-dimensional fabricating apparatus 601 is connected to the control circuit 500.

As described above, the control circuit 500 receives fabrication data from the fabrication data generating apparatus 600. The fabrication data includes shape data (fabrication data) of each fabrication layers 30 as a slice data. The slice data is obtained by slicing the shape of the target three-dimensional object into multiple layers.

The main controller 500A then control the heads 52 to discharge fabrication liquid 10 according to the fabrication data of the fabrication layer 30.

The control circuit 500 includes a negative pressure controller 530 to control negative pressure in the sub tanks 103 of the heads 52. Next, the negative pressure controller 530 controls to drive the air pump 113 according to the detection results of the negative pressure gauge 114 of the vacuum device 110. Thereby, the pressure inside the sub tank 103 is controlled within a predetermined negative pressure status. The negative pressure controller 530 also controls an electrifying process (a power supply process) to the pressing member 144.

Note that the fabrication data generating apparatus 600 and the three-dimensional fabricating apparatus 601 together constitute a fabrication system.

Next, the fabrication process will be described referring to FIG. 10.

Here, the fabrication process is described from a state where the first layer of the fabrication layer 30 (hereinafter, simply "preceding fabrication layer") is formed on the fabrication stage 24 of the fabrication chamber 22.

When forming the next-fabrication layer 30 on this preceding fabrication layer 30, the fabrication stage 24 of the fabrication chamber 22 is moved downward in Z-direction as illustrated in FIG. 8.

Then, in a fabrication process as illustrated in FIGS. 9 and 10, the heads 52 of the liquid discharge unit 50 discharges liquid droplets of fabrication liquid 10 on the preceding fabrication layer 30, which is formed on the fabrication stage 24, to form a next-fabrication layer 30 having a desired shape on the preceding fabrication layer 30 (fabrication liquid discharge).

The flattening roller 12 flattens the surface of the next-fabrication layer 30 that is formed on the preceding fabrication layer 30 (flattening process). The fabrication liquid curing unit 700 irradiates an ultraviolet ray to the next-fabrication layer 30, the surface of which is flattened by the flattening roller 12, to perform a polymerization curing of the next-fabrication layer 30 (fabrication layer curing process).

A plurality of the fabrication layers 30 having a desired shape is laminated and formed on the fabrication stage 24 by repealing the above-described processes.

The heads 52, the flattening roller 12, and the fabrication liquid curing unit 700 are mounted on the carriage 51. Therefore, the fabrication liquid discharge by the heads 52, the flattening process by the flattening roller 12, and the fabrication layer curing process by the fabrication liquid curing unit 700 are performed one after the other while the three-dimensional fabrication apparatus 601 is moving in a left direction along the main scanning direction (X-direction) of the carriage 51 as illustrated in FIG. 10.

Then, by repeating the described steps of the fabrication liquid discharge by the heads 52, the flattening process by the flattening roller 12, and the fabrication layer curing process by the fabrication liquid curing unit 700 for a required number of times, the plurality of the fabrication layers 30 is formed on the fabrication stage 24. At this time, the next-fabrication layer 30 and the preceding fabrication layer 30 are united to form a part of a three-dimensional fabrication object (three-dimensional object). Then, by repeating the steps of the fabrication liquid discharge, the flattening process, and the fabrication liquid curing process for a required amount of times, the fabrication process of the three-dimensional fabrication object (three-dimensional object) is completed.

In the above-described embodiments of the present disclosure, "the liquid discharge apparatus" includes a head device that drives a liquid discharge head to discharge liquid.

The term "liquid discharge apparatus" used here includes, in addition to apparatuses to discharge liquid to materials to which the liquid can adhere, apparatuses to discharge the liquid into gas (air) or liquid.

The liquid discharge apparatus 300 may include devices to feed, convey, and eject the medium on which liquid can adhere. The liquid discharge apparatus 300 may further include a pretreatment apparatus to coat a treatment liquid onto the medium, and a post-treatment apparatus to coat a treatment liquid onto the medium, onto which the liquid has been discharged.

The liquid discharge apparatus 300 may be, for example, an image forming apparatus to form an image on a sheet by discharging ink, or a three-dimensional fabrication apparatus to discharge a fabrication liquid to form a three-dimensional object.

In addition, the liquid discharge apparatus 300 is not limited to such an apparatus to form and visualize meaningful images, such as letters or figures, with discharged liquid. For example, the liquid discharge apparatus 300 may be an apparatus to form meaningless images, such as meaningless patterns, or fabricate three-dimensional images.

The above-described term "medium on which liquid can be adhered" represents a medium on which liquid is at least temporarily adhered, a medium on which liquid is adhered and fixed, or a medium into which liquid is adhered to permeate.

Examples of the "medium on which liquid can be adhered" include recording media, such as paper sheet, recording paper, recording sheet of paper, film, and cloth, electronic component, such as electronic substrate and piezoelectric element, and media, such as powder layer, organ model, and testing cell.

The "medium on which liquid can be adhered" includes any medium on which liquid is adhered, unless particularly limited.

Examples of "the medium on which liquid can be adhered" include any materials on which liquid can be adhered even temporarily, such as paper, thread, fiber, fabric, leather, metal, plastic, glass, wood, and ceramic.

Examples of the liquid are, e.g., ink, treatment liquid, DNA sample, resist, pattern material, binder, fabrication liquid, or solution and dispersion liquid including amino acid, protein, or calcium.

"The liquid discharge apparatus" may be an apparatus to relatively move a liquid discharge head and a medium on which liquid can be adhered. However, the liquid discharge apparatus 300 is not limited to such an apparatus. For example, the liquid discharge apparatus 300 may be a serial head apparatus that moves the liquid discharge head or a line head apparatus that does not move the liquid discharge head.

The terms "image formation", "recording", "printing", "image printing", and "fabricating" used herein may be used synonymously with each other.

In the present disclosure, discharged "liquid" is not limited to a particular liquid as long as the liquid has a viscosity or surface tension to be discharged from a liquid discharge head. However, preferably, the viscosity of the liquid is not greater than 30 mPa·s under ordinary temperature and ordinary pressure or by heating or cooling.

Examples of "the liquid" include a solution, a suspension, or an emulsion including, for example, a solvent, such as water or an organic solvent, a colorant, such as dye or pigment, a functional material, such as a polymerizable compound, a resin, a surfactant, a biocompatible material, such as DNA, amino acid, protein, or calcium, and an edible material, such as a natural colorant.

Such a solution, a suspension, or an emulsion can be used for, e.g., inkjet ink, surface treatment solution, a liquid for forming components of electronic element or light-emitting element or a resist pattern of electronic circuit, or a material solution for three-dimensional fabrication.

"A liquid discharge head" includes an energy source. Examples of the energy source for generating energy to discharge liquid include a piezoelectric actuator (a laminated piezoelectric element or a thin-film piezoelectric element), a thermal actuator that employs a thermoelectric conversion element, such as a thermal resistor, and an electrostatic actuator including a diaphragm and opposed electrodes.

Examples of the "liquid discharge apparatus" as used in this specification further include a treatment liquid coating apparatus to discharge a treatment liquid to a sheet to coat the treatment liquid on the surface of the sheet to reform the sheet surface and an infection granulation apparatus in which a composition liquid including raw materials dispersed in a solution is injected through nozzles to granulate fine particles of the raw materials.

Numerous additional modifications and variations are possible in light of the above teachings. It is therefore to be understood that, within the scope of the above teachings, the present disclosure may be practiced otherwise than as specifically described herein. With some embodiments having thus been described, it is obvious that the same may be varied in many ways. Such variations are not to be regarded as a departure from the scope of the present disclosure and appended claims, and all such modifications are intended to be included within the scope of the present disclosure and appended claims.

What is claimed is:

1. A liquid supply apparatus, comprising:
   a liquid container to temporarily store liquid,
   a vacuum device connected to the liquid container to decompress the liquid container to form a negative pressure in the liquid container; and
   a negative pressure forming device disposed between the liquid container and the vacuum device,
   wherein the negative pressure forming device includes:
     a gas chamber connected to the liquid container;
     a flexible member forming a part of wall surface of the gas chamber;
     a first elastic member to push the flexible member in a first direction to expand the gas chamber; and
     a pressing member to push the flexible member in a second direction opposite the first direction to compress the gas chamber,
   wherein the gas chamber moves between a connection position where a connection between the gas chamber and the vacuum device is established and a cutoff position where the connection is cut off;
   wherein the gas chamber is in the connection position when the pressing member pushes the flexible member to compress the gas chamber, and the gas chamber is in the cutoff position when the pressing member is released from pressing the flexible member so that the first elastic member expands the gas chamber to maintain negative pressure inside the liquid container while the connection is cut off.

2. The liquid supply apparatus according to claim 1, wherein the pressing member is released from pressing the flexible member when a power supply to the vacuum device is cut off.

3. The liquid supply apparatus according to claim 2, wherein the pressing member includes a solenoid having a plunger to push the flexible member to compress the gas chamber when the solenoid is activated.

4. The liquid supply apparatus according to claim 1, wherein the negative pressure forming device includes:
   an air chamber member that forms the gas chamber; and
   a housing to movably accommodate the air chamber member; and
   a second elastic member to press the air chamber member,
   wherein the housing includes a first opening that is connected to the vacuum device;
   the air chamber member includes a second opening faceable to the first opening of the housing;
   the second elastic member presses the air chamber member to the cutoff position where the second opening is not aligned with the first opening;
   the air chamber member moves to the connection position where the first opening is aligned with the second opening when the pressing member presses the flexible member against a restorative force of the second elastic member; and
   the air chamber member moves to the cutoff position where the first opening is not aligned with the second opening by the restorative force of the second elastic member when the pressing member is released from pressing the flexible member.

5. The liquid supply apparatus according to claim 1, further comprising:
   a displacement member that displaces according to a deformation of the flexible member;
   a detector to detect displacement of the displacement member when the displacement member moves to a predetermined position; and
   circuitry to control the pressing member to press the flexible member or to be released from pressing the flexible member,
   wherein the circuitry executes:
   detecting the displacement member that moves to the predetermined position with the detector when the negative pressure forming device forms negative pressure inside the liquid container while the connection between the gas chamber and the vacuum device is cut off when the pressing member is released from pressing the flexible member;
   pressing the flexible member with the pressing member to establish the connection between the gas chamber and the vacuum device after the detecting of the displacement member;
   forming negative pressure in the liquid container by the vacuum device after the pressing of the flexible member; and
   releasing the pressing member from pressing the flexible member after the forming of the negative pressure.

6. A liquid discharge apparatus comprising:
   a liquid discharge head to discharge a liquid;
   a liquid container to temporarily store the liquid to be supplied to the liquid discharge head; and
   a liquid supply device to supply liquid in the liquid container to the liquid discharge head,
   wherein the liquid supply device includes:
     a vacuum device connected to the liquid container to decompress the liquid container to form a negative pressure in the liquid container; and
     a negative pressure forming device disposed between the liquid container and the vacuum device,
   wherein the negative pressure forming device includes:
     a gas chamber connected to the liquid container;
     a flexible member forming a part of wall surface of the gas chamber;
     a first elastic member to push the flexible member in a first direction to expand the gas chamber; and
     a pressing member to push the flexible member in a second direction opposite the first direction that compresses the gas chamber;
   wherein the gas chamber moves between a connection position where a connection between the gas chamber and the vacuum device is established Mid a cutoff position where the connection is cut off;

the gas chamber is in the connection position when the pressing member pushes the flexible member to compress the gas chamber; and the gas chamber is in the cutoff position when the pressing member is released from pressing the flexible member so that the first elastic member expands the gas chamber to maintain negative pressure inside the liquid container while the connection is cut off.

7. A three dimensional fabricating apparatus comprising:

a liquid discharge head to discharge a liquid;

a liquid container to temporarily store the liquid to be supplied to the liquid discharge head;

a liquid supply device to supply liquid in the liquid container to the liquid discharge head, and a liquid curing unit to cure the liquid discharged from the liquid discharge head, wherein the liquid supply device includes:

a vacuum device connected to the liquid container to decompress the liquid container to form a negative pressure in the liquid container;

a negative pressure forming device disposed between the liquid container and the vacuum device, wherein the negative pressure forming device includes;

a gas chamber connected to the liquid container;

a flexible member forming a part of wall surface of the gas chamber;

a first elastic member to push the flexible member in a first direction to expand the gas chamber; and a pressing member to push the flexible member in a second direction opposite the first direction that compresses the gas chamber;

wherein the gas chamber moves between a connection position where a connection between the gas chamber and the vacuum device is established and a cutoff position where the connection is cut off;

the gas chamber is in the connection position when the pressing member pushes the flexible member to compress the gas chamber; and the gas chamber is in the cutoff position when the pressing member is released from pressing the flexible member so that the first elastic member expands the gas chamber to maintain a pressure inside the liquid container to be negative while the connection is cut off.

* * * * *